(No Model.)

A. STORCK.
Air Pressure Apparatus for Beer Barrels.

No. 239,993.　　　　　　　　Patented April 12, 1881.

WITNESSES
F. W. Kasehagen
Oliver W. Marble

INVENTOR
Albrecht Storck
By Lotz & Dyer
Attorneys.

UNITED STATES PATENT OFFICE.

ALBRECHT STORCK, OF CHICAGO, ILLINOIS.

AIR-PRESSURE APPARATUS FOR BEER-BARRELS.

SPECIFICATION forming part of Letters Patent No. 239,993, dated April 12, 1881.

Application filed November 27, 1880. (No model.) Patented in Germany November 15, 1877.

*To all whom it may concern:*

Be it known that I, ALBRECHT STORCK, a subject of the Emperor of Germany, residing at Chicago, in the county of Cook and State of Illinois, have invented a new and useful Air-Pressure Apparatus for Beer-Barrels, (for certain features of which I have obtained a patent in Germany, No. 1,334, bearing date November 15, 1877,) of which the following is a specification.

My invention relates to improvements in apparatus for supplying compressed air into beer barrels or kegs while the same are on draft; and the objects of my improvement are, first, to fill up the emptied space in the barrel with fresh air under sufficient pressure to prevent the separation and escape of the carbonic-acid gas contained in the beer; and, second, to provide means for regulating the temperature of the air before it enters the beer-barrels.

Figure 1:
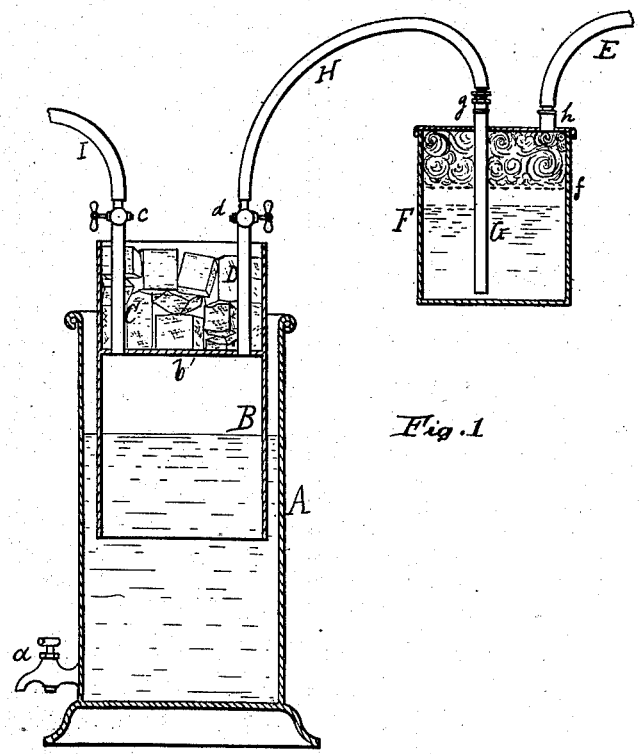
Figure 2:
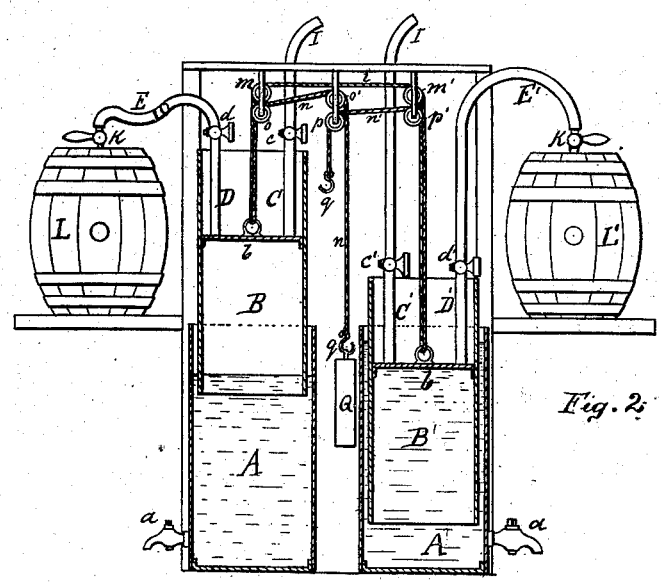

In the accompanying drawings, Figure 1 represents a sectional view of the air-compressing apparatus in connection with the air-purifying vessel, and Fig. 2 represents a similar view of a double air-compressing apparatus and its connection with two beer-barrels.

Like letters in the several figures designate like parts.

A is a cylindrical vessel, which is open on top and has a faucet, $a$, near its bottom. This vessel is to be filled with water, which from time to time is to be replaced by fresh water by first emptying the vessel through faucet $a$.

B is a cylinder of less diameter, which is to move vertically inside of vessel A. This cylinder B is open on top and bottom, and about one-third its whole length from top it has a diaphragm, $b$, which divides the space in the cylinder into an upper and lower chamber. The lower chamber is to contain the atmospheric air to be compressed, and is to be of sufficient capacity for supplying a requisite volume of air under uniform pressure, to fill the barrel or keg until the beer therein has been entirely withdrawn. The lower end of the cylinder B is to be immersed in the water in vessel A for preventing the escape of air from under. The chamber above the diaphragm $b$ in cylinder B is to be filled either with ice during summer-time or with warm water during winter-time, for the purpose of bringing the air to the proper temperature most desirable for the beer. This ice or water filled into the upper chamber also furnishes the necessary weight for compressing the air in the lower chamber.

From diaphragm $b$ rise two standard-pipes, C and D, each with a faucet, $c$ and $d$. Through pipe C and faucet $c$ air is admitted into the lower chamber of cylinder B, and through pipe D and faucet $d$ the air is conducted into the beer-barrel, in the manner that for charging the apparatus with the necessary supply of air faucet $d$ is closed and faucet $c$ is opened. Now the cylinder B is raised until its lower end is nearly out of the water in vessel A, when the faucet $c$ is closed. The air thus captured in the lower chamber will hold the cylinder B floating on the water, and will be compressed to a certain extent.

F is a hermetically-closed vessel, having a horizontal and perforated diaphragm, $f$.

G is a pipe pierced through the top of the vessel F and through the diaphragm $f$, and reaching to near the bottom of vessel F. This pipe G has a hose-coupling, $g$, on its upper extremity. A rubber hose, H, forms the connection between pipe G and faucet $d$. A neck or nipple, $h$, is secured to the top of vessel F for coupling the rubber hose E. The space below the perforated diaphragm $f$ is filled with a solution of salicylic acid, and the space above the diaphragm $f$ in vessel F is packed with loose cotton.

The hose I, which is secured to faucet $c$, is brought in connection with a window or duct leading outdoors, whence fresh air can be drawn in; and the hose E connects with the vent-cock K, which is driven into the bung-hole of a barrel or keg, L.

As will be noticed, all the air forced by the compressing apparatus to the beer-barrel has to pass through the salicylic acid and through the cotton in vessel F, where all poisonous and unhealthy impurities which could spoil the beer are destroyed and neutralized.

The vent-cock K may be arranged internally with a ball or other suitable valve to operate in a manner that, as long as the pressure of the carbonic-acid gases in the beer-barrel is greater than the pressure of the air from the apparatus, the valve will be shut against the air-pressure, and will prevent the carbonic-acid gases from entering and escaping into the hose E, the vessel F, or into the air-chamber of cylinder B; but as soon as the pressure of air from the apparatus becomes greater, said valve will open and will allow the air to enter the barrel.

In Fig. 2 I have shown an apparatus with double air-compressing cylinders, which are connected in a manner that the sinking of one cylinder, B, will cause the raising of the other cylinder, B'. For this purpose I have suspended cylinders B and B' to the ends of a cord, chain, or rope, $l$, of proper length, which is passed over two pulleys, $m$ and $m'$. To each cylinder, B and B', I secure an independent rope, $n$ $n'$, which I pass one over pulleys $o$ $o'$ and the other one over pulleys $p$ $p'$. Each rope has a hook, $q$, secured to its end for suspending a weight, Q. This weight Q is sufficiently heavy to counterbalance either one of the cylinders B B' which is intended to rise and refill with air while the other cylinder is sinking and is supplying compressed air to a beer-barrel. After one cylinder, B, has exhausted its supply of air, which will be the case with each tapping of another beer-barrel, all the faucets have to be closed, the weight Q has to be suspended to the other hook, $q'$, and now the faucets, which were closed during the time the cylinder B was supplying air, will have to be opened after the vent-cock K' has been secured to barrel L', when cylinder B' will furnish compressed air into said barrel L'.

I am aware that automatic air-pumping apparatus have been in use heretofore for similar purposes; but these, as far as I could learn, were operated by the pressure from the hydrant, and required about two barrels of water for every barrel of beer to be drawn, and therefore they can be used only in cities having water-works, and then with an extra expense for water-tax, while my apparatus can be used everywhere. On account of its great simplicity it is less liable to get out of order, and can be easily managed to perform the duties for which it is designed.

What I claim as my invention, and desire to secure by Letters Patent, is—

1. In air-compressing apparatus for the purpose set forth, the combination, with the water-vessel A, of the cylinder B, open at both ends and provided with diaphragm $b$, which divides the cylinder into a lower air-compressing chamber and an upper chamber for containing ice or water, substantially as described and shown.

2. The vessels A A' and cylinders B B', having diaphragms $b$, pipes C C' and D D', and faucets $c$ $c'$ and $d$ $d'$, said cylinders being connected by cord $l$, passed over pulleys $m$ $m'$, to operate simultaneously, and arranged with cords $n$ $n'$ passing over pulleys $o$ $o'$ and $p$ $p'$, for suspending weight Q, all as and for the purpose substantially as described and shown.

ALBRECHT STORCK.

Witnesses:
F. W. KASEHAGEN,
OLIVER W. MARBLE.